US011113297B2

(12) United States Patent
Ikeda (10) Patent No.: US 11,113,297 B2
(45) Date of Patent: Sep. 7, 2021

(54) INFORMATION PROCESSING DEVICE AND INFORMATION TERMINAL

(71) Applicant: Karakuri, inc., Tokyo (JP)

(72) Inventor: Kazuo Ikeda, Tokyo (JP)

(73) Assignee: Qufooit Japan Ltd., Tokyo (JP)

( * ) Notice: Subject to any disclaimer, the term of this patent is extended or adjusted under 35 U.S.C. 154(b) by 23 days.

(21) Appl. No.: 16/182,136

(22) Filed: Nov. 6, 2018

(65) Prior Publication Data

US 2019/0138657 A1 May 9, 2019

(30) Foreign Application Priority Data

Nov. 6, 2017 (JP) .............................. JP2017-213472

(51) Int. Cl.
| | |
|---|---|
| *G06F 16/248* | (2019.01) |
| *G06F 3/0482* | (2013.01) |
| *G06F 9/451* | (2018.01) |
| *G06F 16/957* | (2019.01) |
| *G06F 16/9535* | (2019.01) |
| *G06F 16/958* | (2019.01) |

(52) U.S. Cl.
CPC .......... *G06F 16/248* (2019.01); *G06F 3/0482* (2013.01); *G06F 9/452* (2018.02); *G06F 16/958* (2019.01); *G06F 16/9535* (2019.01); *G06F 16/9577* (2019.01)

(58) Field of Classification Search
CPC ........................... G06F 16/248; G06F 16/9577
See application file for complete search history.

(56) References Cited

U.S. PATENT DOCUMENTS

| | | | | |
|---|---|---|---|---|
| 2006/0026013 | A1* | 2/2006 | Kraft .................. | G06F 16/9535 705/1.1 |
| 2007/0282825 | A1* | 12/2007 | Toub .................. | G06F 16/9535 |
| 2008/0154859 | A1* | 6/2008 | Chi ..................... | G06F 16/9535 |
| 2014/0358970 | A1* | 12/2014 | Morris ................ | G06F 9/445 |

(Continued)

FOREIGN PATENT DOCUMENTS

| | | | | |
|---|---|---|---|---|
| EP | 1463307 A2 * | 9/2004 | ............ | G06F 16/78 |
| JP | 2008-508605 | 3/2008 | | |

(Continued)

OTHER PUBLICATIONS

Saxena, "Howto make a header with logo and search bar using html and CSS?," Oct. 19, 2017, https://web.archive.org/web/20171022010700/https://www.includehelp.com/code-snippets/make-a-header-with-logo-and-search-bar-using-html-and-css.aspx.*

(Continued)

*Primary Examiner* — Ryan Barrett
(74) *Attorney, Agent, or Firm* — Muncy, Geissler, Olds & Lowe, P.C.

(57) ABSTRACT

A website server provides a program for a web page of a predetermined website to a user terminal. The program for the web page causes the user terminal to implement a display module and a search module. The display module causes a first article selected by a user to be displayed and causes a search window to be displayed at a position after a position where the first article ends. The search module searches for a second article related to a character string entered in the search window. The display module causes information related to the second article identified by a search using the search module to be displayed near the search window.

6 Claims, 8 Drawing Sheets

(56) References Cited

U.S. PATENT DOCUMENTS

| | | | | |
|---|---|---|---|---|
| 2014/0359598 A1* | 12/2014 | Oliver | ....................... | G06F 8/61 |
| | | | | 717/174 |
| 2016/0124585 A1* | 5/2016 | Delacroix | ........... | G06F 16/2428 |
| | | | | 715/739 |
| 2016/0283580 A1* | 9/2016 | Amacker | ........... | G06Q 30/0643 |
| 2017/0212874 A1* | 7/2017 | Urban | ................... | G06F 16/957 |

FOREIGN PATENT DOCUMENTS

| | | | |
|---|---|---|---|
| JP | 2008234231 A | 10/2008 | |
| WO | WO-2006/014835 A2 | 2/2006 | |
| WO | WO-2015/130721 A1 | 9/2015 | |

OTHER PUBLICATIONS

Kanik, "How to Use Analytics to Understand and Improve Audience Engagement," Mar. 16, 2016, http://mediashift.org/2016/03/how-to-use-analytics-to-understand-and-improve-audience-engagement/.*

TechTerms, "Navigation Bar," Sep. 25, 2011, https://web.archive.org/web/20110925003745/https://techterms.com/definition/navigation_bar.*

McGee, "Google Instant Search: The Complete User's Guide," Sep. 8, 2010, https://searchengineland.com/google-instant-complete-users-guide-50136.*

Office Action dated Sep. 8, 2020 in JP application No. 2017-213472.

* cited by examiner

INFORMATION PROCESSING DEVICE AND INFORMATION TERMINAL

BACKGROUND OF THE INVENTION

1. Field of the Invention

The present invention relates to data processing technologies and, in particular, to an information processing device and a computer program.

2. Description of the Related Art

A web page provided by a website is often provided with a search window for use to search the site for a content (an article, product information, etc.) in the website.

[patent document 1] JP2008-234231

A search window is useful to smoothly provide the content in the website desired by a user. We have considered that there is room for improvement in information search using a search window.

SUMMARY OF THE INVENTION

The embodiments address the above-described issue, and a purpose thereof is to improve convenience of information search in a site that provides documents describing information electronically.

An information processing device according to an embodiment is adapted to provide a computer program to a user terminal. The computer program is adapted to cause the user terminal to implement modules including: a display module that causes a first article selected by a user to be displayed and causes a search window to be displayed at a position after a position where the first article ends; and a search module that searches for a second article related to a character string entered in the search window. The display module causes information related to the second article identified by a search using the search module to be displayed near the search window.

Another embodiment relates to an information terminal. The information terminal executes a computer program adapted to cause the information terminal to implement modules including: a display module that causes a first article selected by a user to be displayed and causes a search window to be displayed at a position after a position where the first article ends; and a search module that searches for a second article related to a character string entered in the search window. The display module causes information related to the second article identified by a search using the search module to be displayed near the search window.

Optional combinations of the aforementioned constituting elements, and implementations of the invention in the form of methods, apparatuses, systems, and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

First Embodiment

Figure 1:
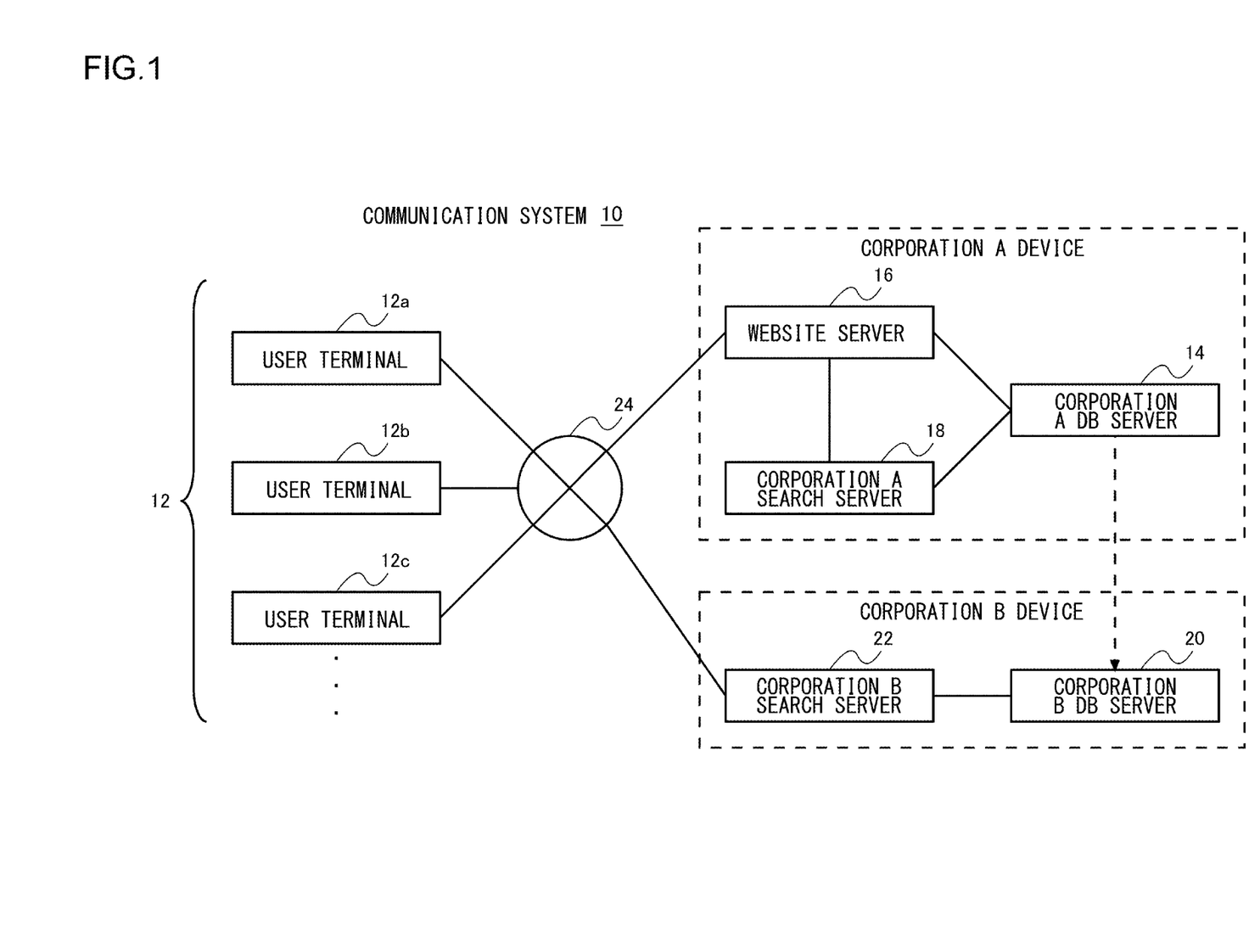
FIG. 1 shows a configuration of a communication system according to a first embodiment.

FIG. 1 shows a configuration of a communication system 10 according to a first embodiment. The communication system 10 is an information processing system that provides information to a user and an information processing system that supports information search by the user. The communication system 10 includes a user terminal 12a, a user terminal 12b, and a user terminal 12c (generically referred to as "user terminals 12") that are information processing devices operated by different users. The user terminal 12 may be a PC, a tablet terminal, or a smartphone. The communication system 10 includes an information processing device of corporation A (corporation A device) and an information processing device of corporation B (corporation B device). The devices of FIG. 1 are connected via a communication network 24 including LAN, WAN, and the internet.

Corporation A in the embodiment is a company that publishes a website (an information site for hobbies and living in the embodiment) on the internet. The corporation A device includes a corporation A DB server 14, a website server 16, and a corporation A search server 18. The corporation A DB server 14 is a database server that stores web page data of the corporation A website. The corporation A DB server 14 stores web pages implemented in HTML, JavaScript (registered trademark), etc.

The website server 16 has the function of a web server. In response to a request from a user terminal 12 (web client), the website server 16 provides web page data (a computer program stored in the corporation A DB server 14) to the user terminal 12. The corporation A search server 18 provides a service for search within the corporation A website based on the web page data stored in the corporation A DB server 14.

The corporation B in the embodiment is a company that provides a search window service. The corporation B device includes a corporation B DB server 20 and a corporation B search server 22. The corporation B DB server 20 is a database server that stores data related to the web page data of the corporation A website (hereinafter, also referred to as "web page related data"). The web page related data include the title, thumbnail (e.g., data produced by reducing one of the images displayed in the web page), tag of each of the web pages provided by the corporation A website.

The tag can be said to be attribute data or meta data of the web page, and a character string concisely representing the content of the web page is defined as the tag. The tag according to the embodiment is defined at the time of creating the web page and linked to the web page by the creator. In one variation, the corporation B device may use a publicly known text mining technology to extract a word or a phrase representing the content of the web page from the web page data and may automatically link an extracted feature word to the web page as a tag.

Further, the data stored in the corporation B DB server 20 reflects the latest web page data stored in the corporation A DB server 14. For example, the corporation B DB server 20 may receive RSS data (Rich Site Summary, RDF (Resource Description Framework) Site summary, or Really Simple Syndication) showing the updated content of the web page from the corporation A device and update the corporation B DB server 20 based on the RSS data. Alternatively, the data in the corporation A DB server 14 and the data in the corporation B DB server 20 may be synchronized by a publicly known replication technology, and the corporation B DB server 20 may store the same data as the corporation A DB server 14.

The corporation B search server 22 is an information processing device that provides a service for search within the corporation A website based on the data stored in the corporation B DB server 20. The service for search within a site provided by the corporation A search server 18 and the service for search within a site provided by the corporation B search server 22 differ in the search logic. The search logic includes a procedure or an algorithm for searching a web page related to a character string designated by the user in a search (a word, phrase, etc.; hereinafter, referred to as "search string") and is implemented in a program for performing a search within a site.

More specifically, the corporation A search server 18 performs a search process in accordance with a search logic defined by the corporation A (hereinafter, referred to as "corporation A search logic"). Meanwhile, the corporation B search server 22 performs a search process in accordance with a search logic defined by the corporation B (hereinafter, referred to as "corporation B search logic"). The corporation A search logic according to the embodiment extracts a web page containing an article that includes the search string in the title or in the body text as a web page related to the search string. Meanwhile, the corporation B search logic extracts a web page (article) linked to the tag that matches the search string as a web page related to the search string.

In one variation, the corporation A search logic and the corporation B search logic may extract a web page that includes the search string in at least one of the title, body text, and tag. In this case, the corporation A search logic may rank a web page that includes the search string in the title or body text relatively higher. Meanwhile, the corporation B search logic may rank a web page linked to the tag that matches the search string relatively higher.

Figure 2:
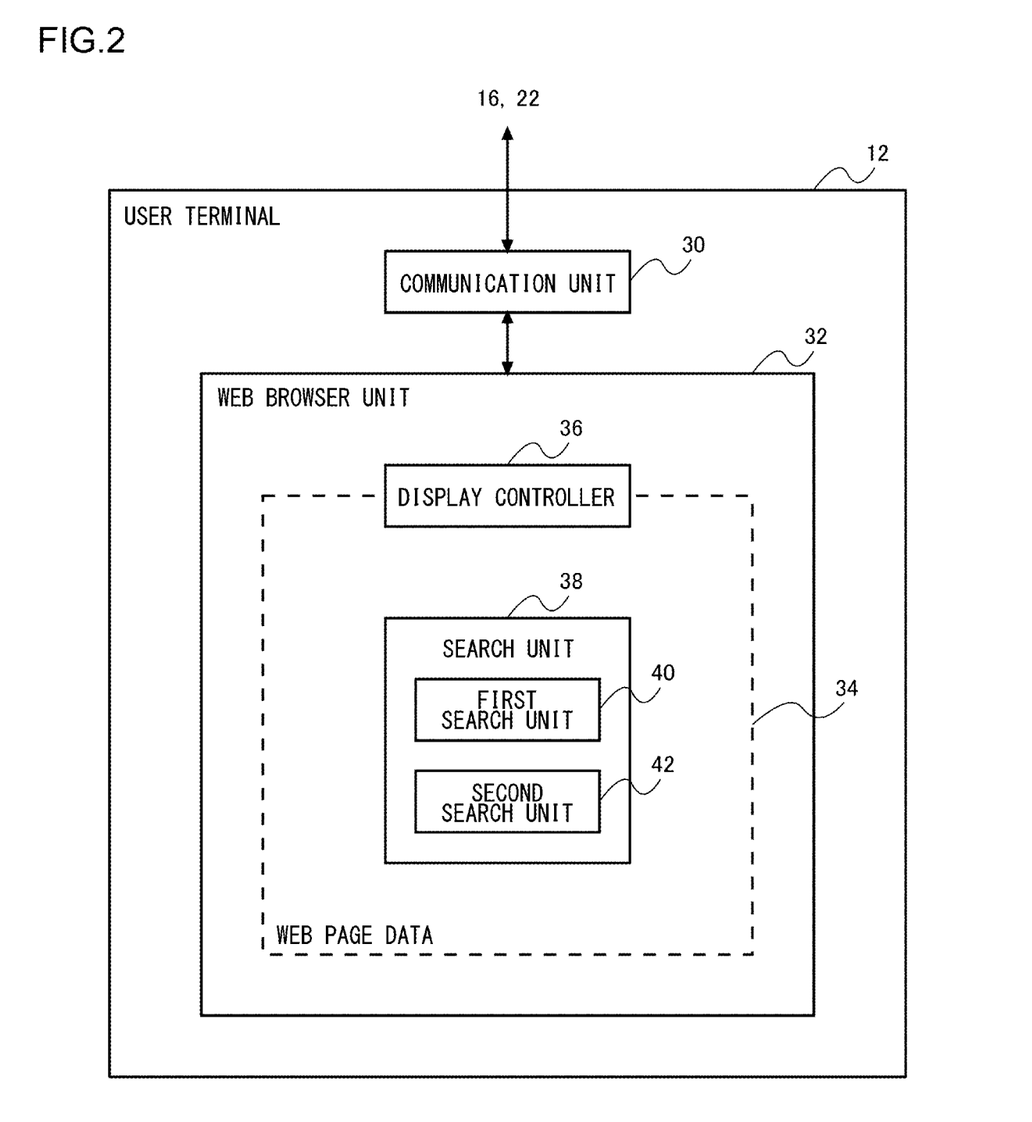
FIG. 2 is a block diagram showing a functional configuration of the user terminal of FIG. 1.

FIG. 2 is a block diagram showing a functional configuration of the user terminal 12 of FIG. 1. The user terminal 12 includes a communication unit 30 and a web browser unit 32. The blocks depicted in the block diagram of this specification are implemented in hardware such as elements or mechanical devices such as a CPU and a memory of a computer, and in software such as a computer program etc. FIG. 2 depicts functional blocks implemented by the cooperation of these elements. Therefore, it will be obvious to those skilled in the art that the functional blocks may be implemented in a variety of manners by a combination of hardware and software.

The communication unit 30 communicates with an external device via the communication network 24 in accordance with a predetermined communication protocol. The web browser unit 32 is implemented by a publicly known web browser application and includes a HTTP user agent function, a syntax analysis function, and a rendering function. The web browser unit 32 transmits and receives data to and from the website server 16, the corporation A search server 18, and the corporation B search server 22 via the communication unit 30.

The web browser unit 32 reads web page data 34 provided by the website server 16 and performs a data process based on the web page data 34. Also, the web browser unit 32 includes a JavaScript engine that interprets and runs a JavaScript program. The web browser unit 32 exhibits functions of a display controller 36 and a search unit 38 by running the JavaScript program included in the web page data 34.

The display controller 36 causes a display (not shown) to display an image of the web page. The display controller 36 is implemented by the coordination of the rendering function and the JavaScript engine provided in the web browser application and the JavaScript program included in the web page data 34.

The search unit 38 searches for a web content (a web page containing an article, according to the embodiment) based on the search string entered by the user. The search unit 38 includes a first search unit 40 and a second search unit 42. The first search unit 40 searches for a web page related to the search string that the user entered in a first search window (described later) by using the search service of the corporation A search server 18. The second search unit 42 searches for a web page related to the search string that the user entered in a second search window (described later) by using the search service of the corporation B search server 22.

A description will be given of the operation in the communication system 10 having the above configuration. The user starts the web browser application in the user terminal 12 to access the corporation A website. The web browser unit 32 of the user terminal 12 requests the website server 16 to provide a web page. The website server 16 receives the request and transmits the web page data of the corporation A website designated by the request to the user terminal 12. The display controller 36 of the user terminal 12 analyzes the web page data provided by the website server 16 and causes the display to display the web page.

The web page data for the corporation A website includes article data (sentences and images to cover a certain issue), a first search window program for performing a search within a site in coordination with the corporation A search server 18, and a second search window program for performing a search within a site in coordination with the corporation B search server 22. For example, the second search window program is a JavaScript program provided by the corporation B to the corporation A and built into the web page data by the corporation A.

Figure 3:
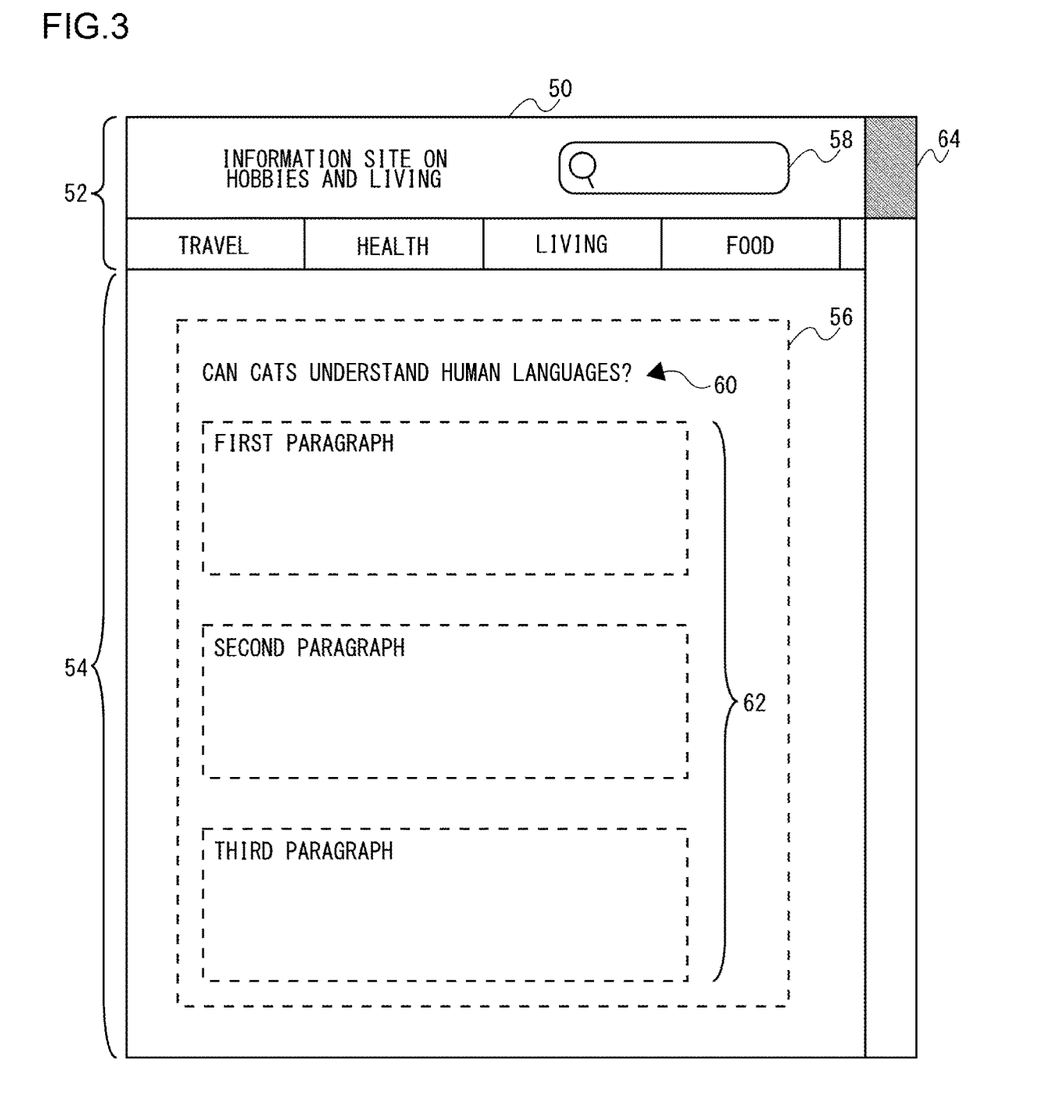
FIG. 3 shows an exemplary web page displayed on the user terminal.

FIG. 3 shows an exemplary web page displayed on the user terminal 12. The figure shows a web page 50 in a window of the web browser displayed on the display of the user terminal 12. The web page 50 includes a header area 52 and a content area 54. The content area 54 is a display area for the main content of the web page. In the embodiment, an article 56 is displayed. The content displayed in the content area 54 is switched by the user's operation for selection. For example, an article that covers a certain issue is switched to an article that covers another issue.

The header area 52 is an area where a common content is displayed regardless of the content (an article in the case of the embodiment) displayed in the content area 54. Stated otherwise, the the same content remains displayed in the header area 52 even if the content area 54 is switched from the first article to the second article. The header area 52 according to the embodiment includes the name of the website, hyperlinks to category levels, and the first search window 58. As the web browser unit 32 executes the first search window program, the display controller 36 causes the first search window 58 to be displayed in the header area 52. The first search window 58 is a text field in which a search string is entered (the second search window 66 described later is similar).

The article 56 includes a title 60 and a body text 62. The body text 62 is divided into a plurality of paragraphs as appropriate. The scroll bar 64 is a user operation element for scrolling the web page 50 and indicates the position (area) of the web page 50 being displayed. The user uses the scroll bar 64 or performs a flick operation in the screen to scroll the web page 50 (vertically scroll in the case of the embodiment) and to view the article 56.

Figure 4:
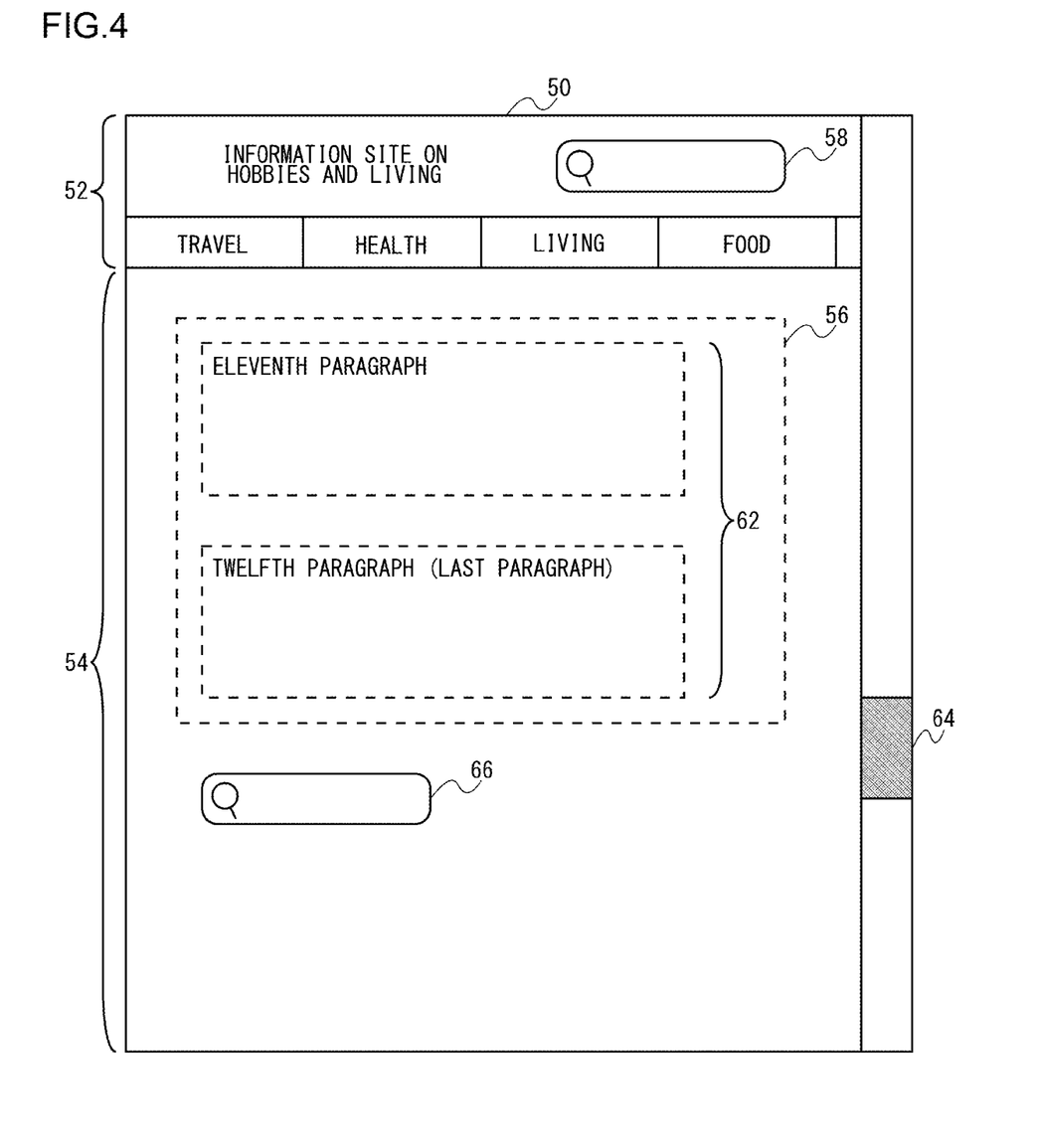
FIG. 4 shows an exemplary web page displayed on the user terminal.

FIG. 4 also shows an exemplary web page displayed on the user terminal 12. The figure shows the content displayed when the web page 50 of FIG. 3 is scrolled downward. By allowing the web browser unit 32 to execute the second search window program when the web page data is loaded, the display controller 36 causes the second search window 66 to be displayed at a position after the position where the article 56 ends. More specifically, the display controller 36 causes the second search window 66 to be displayed below the article 56 (e.g., immediately below the position where the article 56 ends). In the case a further content (a thumbnail of a further article or a hyperlink to a further article) is placed below the article 56, the display controller 36 may cause the second search window 66 to be displayed between the article 56 and the further content, i.e., immediately after the article 56.

A description will be given of a search operation. When the user enters a search string in the first search window 58 and a predetermined user operation designating a search is entered, the first search unit 40 transmits a search request including the search string entered in the first search window 58 to the website server 16. The website server 16 delivers the search request to the corporation A search server 18, and the corporation A search server 18 searches the plurality of articles stored in the corporation A DB server 14 for an article that includes the search string in the title or the body text in accordance with the corporation A search logic.

The corporation A search server 18 delivers search result data including success or failure of the search, and the URL and summary (the title or a portion of the body text, thumbnail, etc.) of the article identified by the search to the website server 16. The website server 16 transmits the web page data including the search result data to the user terminal 12. The web browser unit 32 of the user terminal 12 receives the web page data, and the display controller 36 updates the content displayed in the window of the web browser with the content showing the search result. For example, the display controller 36 causes a list of information on one or more articles identified by the search on the entirety of the content area 54 of the web page 50.

When the user enters a search string in the second search window 66 and a predetermined user operation designating a search is entered, the second search unit 42 transmits a search request including the search string entered in the second search window 66 to the corporation B search server 22. The corporation B search server 22 searches the plurality of articles (summary information, etc. communicated in RSS) stored in the corporation B DB server 20 for an article linked to the tag that matches the search string in accordance with the corporation B search logic.

The corporation B search server 22 informs the user terminal 12 of success or failure of the search and transmits search result data including the URL and summary of one or more articles identified by the search (hereinafter, referred to as "related article"). The web browser unit 32 of the user terminal 12 receives the search result data, and the display controller 36 causes information on one or more related articles near the second search window 66. In the embodiment, the second search unit 42 communicates with the corporation B search server 22 in Ajax (Asynchronous JavaScript+XML) communication. For example, the second search unit 42 communicates using an XMLHttpRequest object. The display controller 36 causes the search result to be dynamically added and displayed in the web page 50 without accompanying reloading of the entirety of the web page 50.

Figure 5:
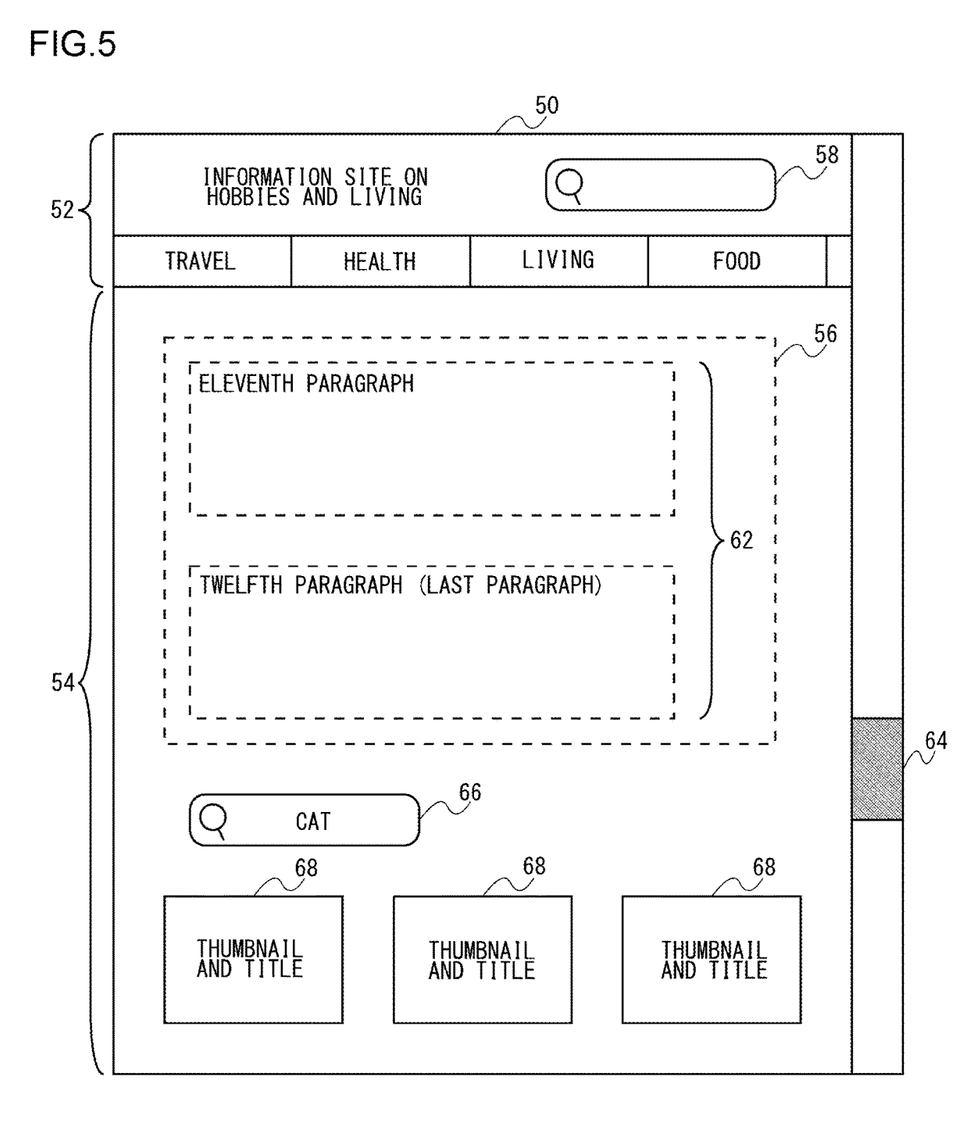
FIG. 5 shows an example of search using the second search window.

FIG. 5 shows an example of search using the second search window 66. The figure shows information on a plurality of related articles 68 (thumbnails, titles, etc.) linked in advance to the tag that matches a character string "cat", the information being horizontally arranged immediately below the second search window 66. A hyperlink to a web page containing the related article is embedded in the related article 68. The user can view a further article related to cats by selecting a desired related article 68. In the case a further content (a thumbnail of a further article, a hyperlink to a further article, etc.) is placed below the second search window 66 in the state shown in FIG. 4 (before the search), the display controller 36 may cause the related article 68 to be displayed between the second search window 66 and the further content, i.e., immediately after the second search window 66.

According to the communication system 10 of the first embodiment, it is possible, by placing the second search window 66 at a position after the position where the article 56 ends, to let the user having read the article to a search within the site casually, using a term that the user is curious of or a theme of interest as a keyword. This can smoothly guide the user to the next content within the website. The embodiment also increases the user's page views per visit to the website and enhances the satisfaction of the user visiting the website.

In further accordance with the communication system 10 of the first embodiment, the first search window 58 is placed in the header area 52, and the second search window 66 is placed at a position after the position where the article 56 ends. Different search logics suited to the position of the search window are used to perform a search within the site. This makes it easy to provide useful search results to users using the respective search windows.

For example, it is considered that the user using the first search window 58 has not read articles or merely has a vague idea of a desired article. Thus, by searching for articles that include the search string in the title or the body text, articles related to the search string are extracted extensively and shallowly. In other words, articles at least including the search string are presented to the user.

Meanwhile, it is considered that the user using the second search window 66 has read the article and has a specific idea of a theme or a keyword that user wishes to read about.

Further, a tag is defined by the creator of the article and is considered to reflect the essential content of the article regardless of whether the character string of the tag is included in the article or not. Thus, by searching for articles linked to the tag that matches the search string, articles whose essential content is relevant to the search string can be extracted and presented to the user regardless of whether the article includes the search string.

Second Embodiment

In the second embodiment, a technology for adjusting the position of the second search window 66 in the web page 50 in accordance with how the web page 50 is viewed by the user. Those elements that are identical or corresponding to the elements of the first embodiment are denoted by the same reference symbols and a description thereof is omitted. Duplicative explanations are omitted appropriately and features different from those of the first embodiment will be highlighted.

Figure 6:
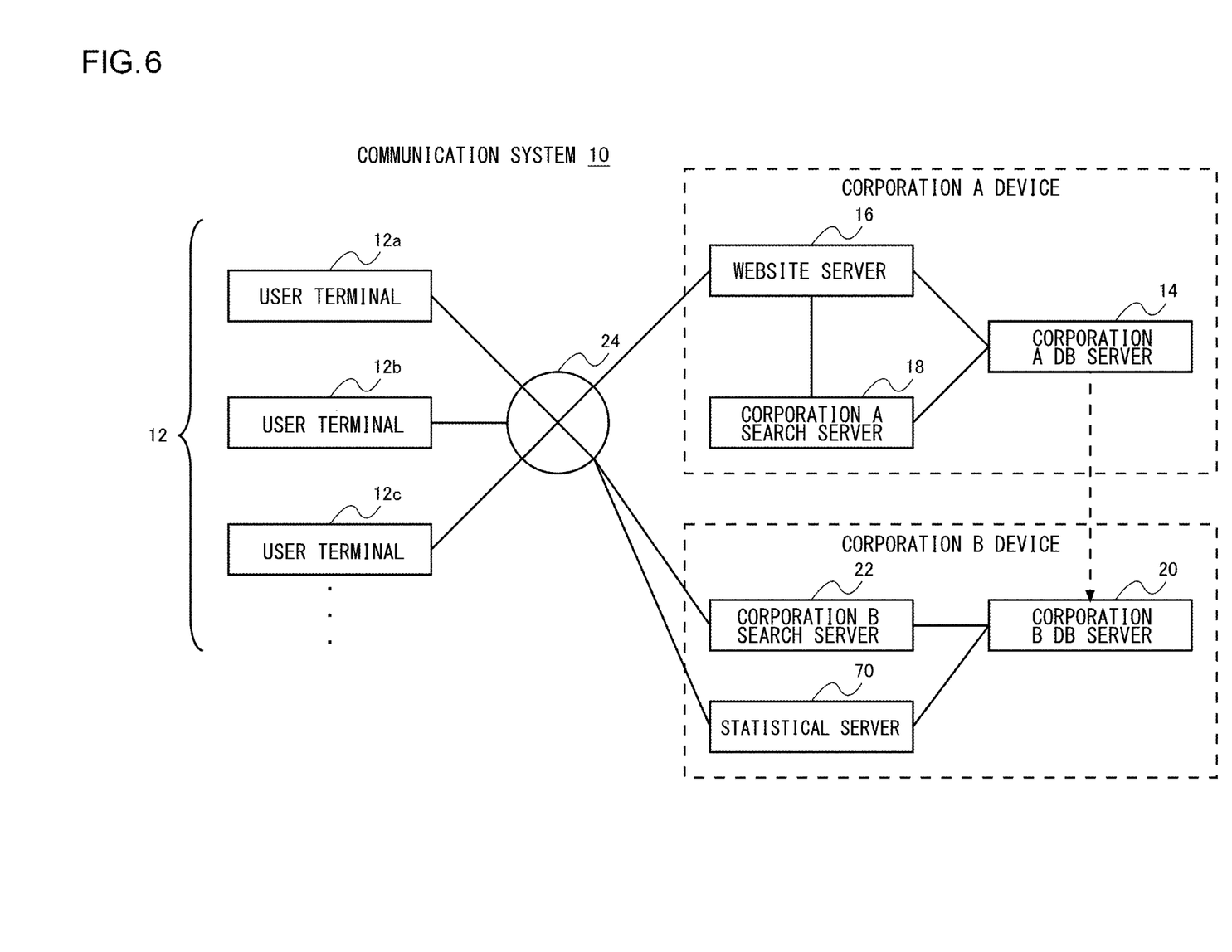
FIG. 6 shows a configuration of the communication system according to the second embodiment.

FIG. 6 shows a configuration of the communication system 10 according to the second embodiment. The corporation B DB server 20 according to the second embodiment stores abandonment point information on points where users leave the web page in addition to the web page related data described in the first embodiment. The abandonment point information is statistical information related to the position where the user viewing a web page (an article in the case of the embodiment) stops viewing (hereinafter, also referred to as "view termination position").

The communication system 10 according to the second embodiment also includes a statistical server 70 in addition to the features of the first embodiment. The statistical server 70 includes a statistical unit (not shown) that acquires a plurality of items of view history information from the plurality of user terminals 12 and configures or updates the abandonment point information of each web page by performing a statistical process based on the plurality of items of view history information.

For example, the view history information may include the URL of the web page viewed by the user (the web page displayed on the user terminal 12) and the view termination position in the web page. The view termination position may be data indicating a proportion occupied by the portion of the web page that was viewed. The statistical unit of the statistical server 70 generates or updates the abandonment point information respectively corresponding to the plurality of web pages by totaling, for each web page (for each URL), the view history information transmitted from the plurality of user terminals 12.

In the embodiment, the abandonment point information corresponding to a given web page includes a view rate that indicates the percentage that each of the paragraphs included in the web page is viewed. The later a paragraph is in the web page, the smaller the value of the view rate. The abandonment point information may be data (a so-called heat map) indicating how the view rate of the paragraph grows smaller toward the end.

Figure 7:
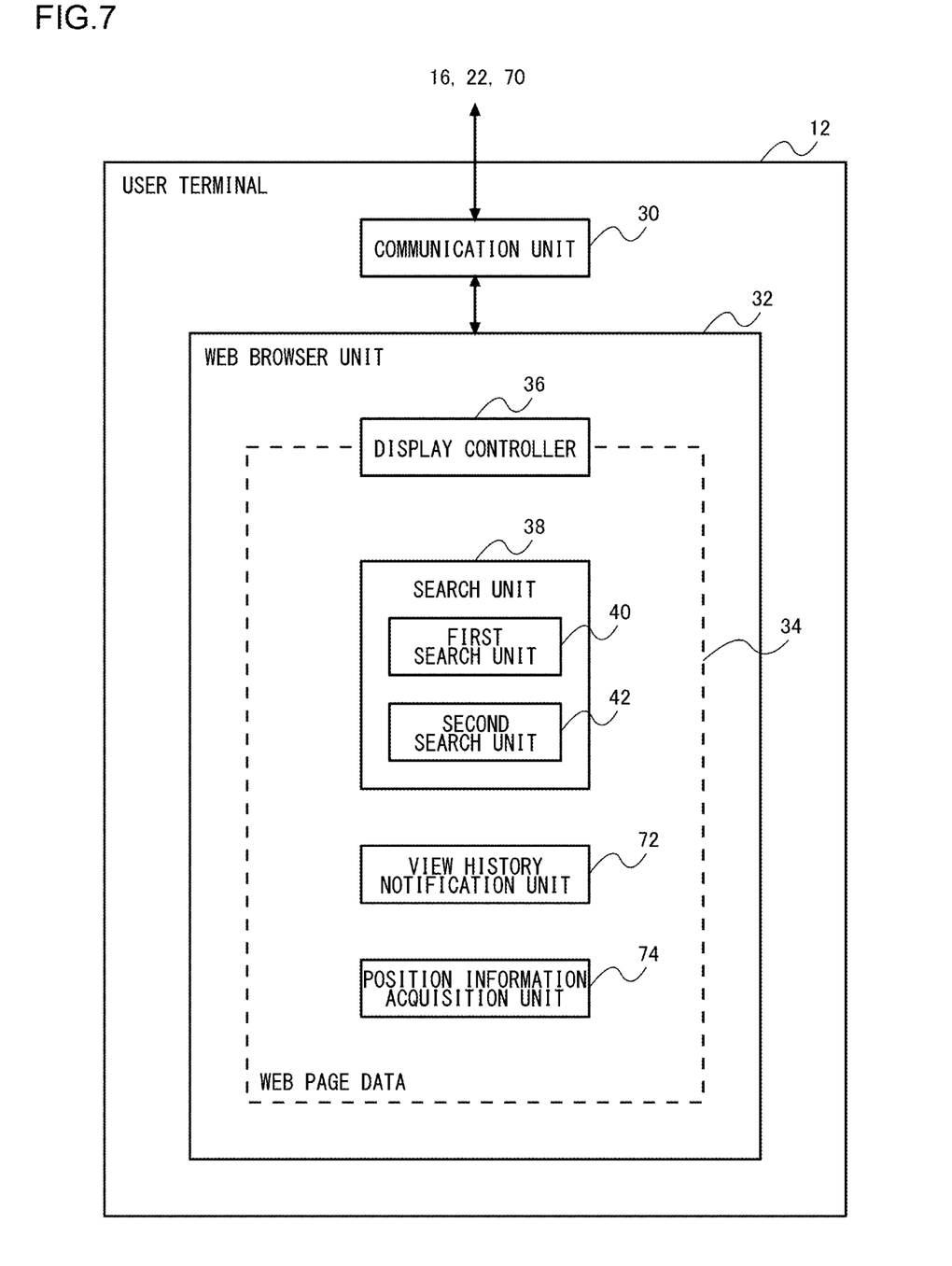
FIG. 7 is a block diagram showing a functional configuration of the user terminal of FIG. 6.

FIG. 7 is a block diagram showing a functional configuration of the user terminal 12 of FIG. 6. The web page data 34 that the website server 16 according to the second embodiment provides to the user terminal 12 further include a JavaScript program for causing the web browser unit 32 to exhibit the functions of a view history notification unit 72 and a position information acquisition unit 74 described later. In other words, the web browser unit 32 according to the second embodiment further exhibits the functions of the view history notification unit 72 and the position information acquisition unit 74 by interpreting and executing the JavaScript written in the web page data 34.

The view history notification unit 72 identifies the view termination position in the web page 50 displayed in the window of the web browser. The view history notification unit 72 may acquire the document size of the web page 50 in the vertical direction (e.g., "document.documentElement.scrollHeight") and the amount of vertical scroll in the window of the web browser (e.g., "window.pageYOffset"). The view history notification unit 72 may derive the view termination position (e.g., data indicating the percentage of the web page 50 viewed) based on the proportion between the document size in the document size and the amount of vertical scroll.

The view history notification unit 72 transmits the view history information including the URL and the view termination position of the web page 50 to the statistical server 70. The view history notification unit 72 may transmit the view history information periodically or transmit, when the web page being displayed is switched, the view history information for the web page that has been displayed hitherto.

Upon receiving the view history information from the user terminal 12, the statistical server 70 updates the abandonment point information for the web page identified by the URL included in the view history information based on the view termination position indicated by the view history information. For example, the statistical server 70 may store the correspondence between the view termination position and the paragraph predefined for each web page (for each article). The statistical server 70 may determine that the web page has been read as far as the paragraph corresponding to the view termination position indicated by the view history information and may update the view rate of each paragraph indicated by the abandonment point information. The statistical server 70 may update an arithmetic average value or a moving average value of the view history information received in the past and the view history information newly received and increase or decrease the view rate of each paragraph indicated by the abandonment point information based on the updated value.

In coordination with the statistical server 70 via the communication network 24, the position information acquisition unit 74 acquires information based on the abandonment point information provided by the statistical server 70 and indicating a position in the web page 50 where the second search window 66 should be displayed (hereinafter, also referred to as "search window position"). When the web page 50 is newly displayed (e.g., when the entire content in the window of the web browser is updated), the position information acquisition unit 74 uses the URL of the web page 50 as a key and acquires the abandonment point information linked to the URL from the statistical server 70.

The position information acquisition unit 74 refers to the abandonment point information and determines, as a search window position, a position immediately before the paragraph, of the plurality of paragraphs included in the article 56, where the view rate is less than a predetermined threshold value (e.g., 50%) or a position where the paragraph immediately before ends. The search window position may be information indicating a position immediately before the sixth paragraph or a position immediately after the fifth paragraph. The threshold value may be configured to be an appropriate value through the knowledge of the developer or an experiment using the communication system 10.

In one variation, the position information acquisition unit 74 may determine, as a search window position, a position immediately before the paragraph where the amount of variation (decrement) in the view rate is equal to or greater than a predetermined value. The statistical server 70, instead of the user terminal 12, may determine a search window position of each of the plurality of web pages based on the abandonment point information of each web page. In this case, the position information acquisition unit 74 may acquire, when a web page is newly displayed, the search window position of the web page from the statistical server 70, using the URL of the web page as a key.

Figure 8:
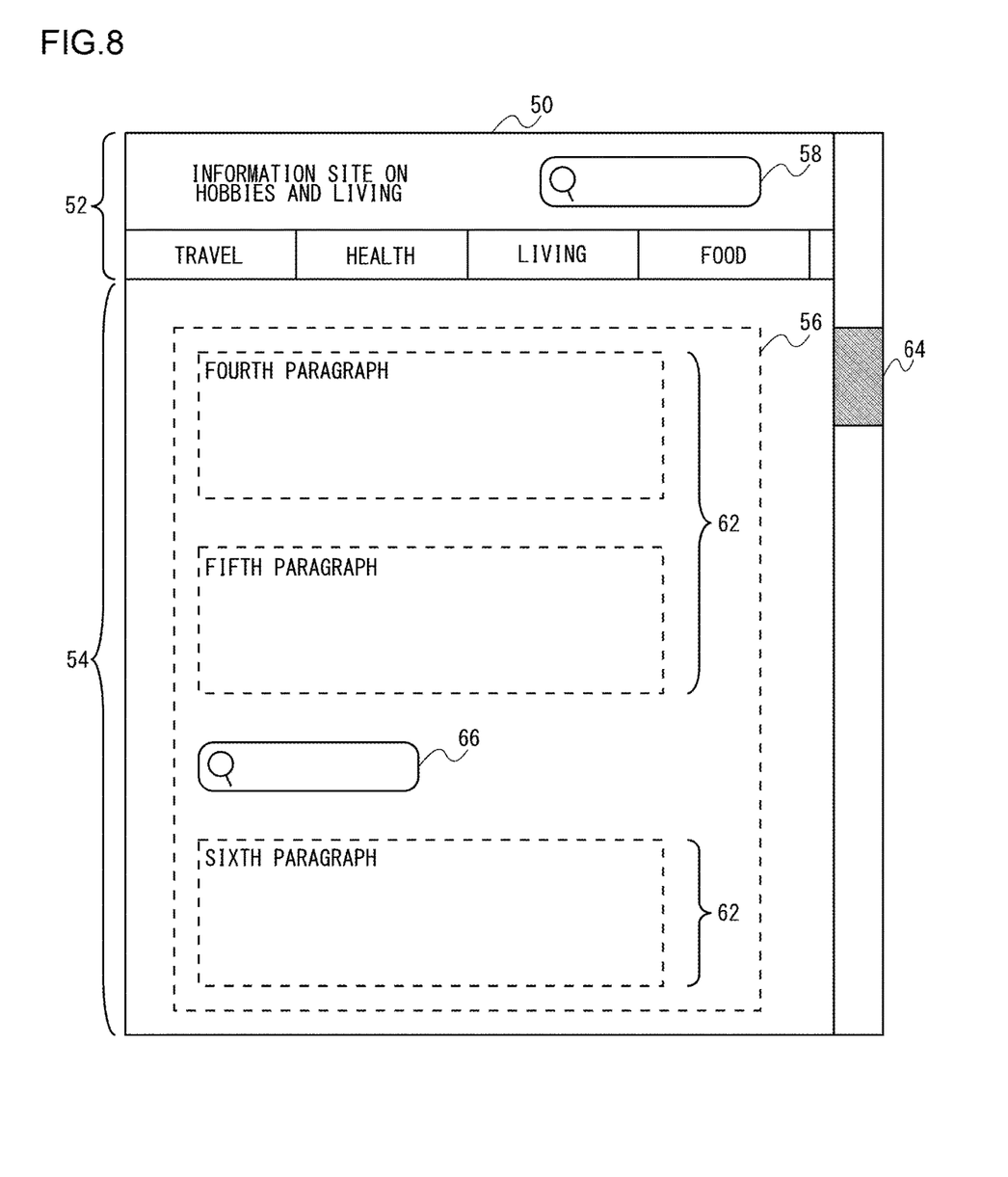
FIG. 8 shows an exemplary web page displayed in the user terminal.

The display controller 36 causes the second search window 66 to be displayed in the middle of the article 56 in accordance with the information on the search window position acquired by the position information acquisition unit 74. FIG. 8 shows an exemplary web page displayed in the user terminal 12. In the case of the web page 50 of FIG. 8, the position immediately after the fifth paragraph of the article 56 is determined to be the search window position. The display controller 36 extracts p tags written in the data for the web page 50 and edits the data for the web page 50 so as to display the second search window 66 immediately after the ending of the fifth p tag from the top. As shown in FIG. 8, this results in the second search window 66 being displayed at a position immediately after the fifth paragraph and immediately before the sixth paragraph.

According to the communication system 10 of the second embodiment, the second search window 66 is placed at a suitable position based on the abandonment point in the web page 50. For example, the second search window 66 can be placed at a position where the user is considered to be likely to leave statistically. This increases the user's page views per visit to the corporation A website and enhances the satisfaction of the user visiting the corporation A website.

Described above is an explanation based on the first embodiment and the second embodiment. The embodiment is intended to be illustrative only and it will be obvious to those skilled in the art that various modifications to constituting elements and processes could be developed and that such modifications are also within the scope of the present invention.

In the second embodiment, a predetermined position (a predetermined paragraph) in the article 56 may be defined as the default display position of the second search window 66. For example, as in the case of the first embodiment, a position after the position where the article 56 ends may be defined as the default display position of the second search window 66. When the abandonment point information is not provided from the statistical server 70, or when the search window position cannot be determined for, for example, the reason that the condition is not met, the display controller 36 may cause the second search window 66 to be displayed at the default position described above. For example, the second search window 66 may be displayed at a position after the position where the article 56 ends, as in the first embodiment.

Alternatively, when the search window position is determined to be in the middle of the article 56, the display controller 36 may cause the second search window 66 to be displayed in the middle of the article 56 (the search window position) instead of at the default position in the article 56. Still alternatively, the display controller 36 may continue to cause the second search window 66 to be displayed at the default position in the article 56 and also causes a new second search window 66 to be displayed in the middle of the article 56 (the search window position).

In the first embodiment and the second embodiment, the first search unit 40 and second search unit 42 of the user terminal 12 perform a search within the corporation A website in coordination with an external search server. In one variation, the first search unit 40 and the second search unit 42 of the user terminal 12 may refer to a storage unit within the user terminal 12 (storing, for example, data similar to that of the corporation B DB server 20) or to an external storage unit (the corporation A DB server 14 or the like) to perform a search within the corporation A website. In this case, the corporation A search logic described in the first embodiment may be implemented in the first search window program for the web page 50 that implements the first search unit 40, and the corporation B search logic described in the first embodiment may be implemented in the second search window program for the web page 50 that implements the second search unit 42.

The corporation A device in the communication system 10 according to the first embodiment and the second embodiment may be implemented by a single information processing device or by a coordination of a larger number of information processing devices than those of the embodiments. The same holds true of the corporation B device in the communication system 10.

Any combination of the embodiment and a variation will also be useful as an embodiment of the present invention. A new embodiment created by a combination will provide the combined advantages of the embodiment and the variation as combined. It will be understood to a skilled person that the functions achieved by the constituting elements recited in the claims are implemented either alone or in combination by the constituting elements shown in the embodiment and the variation.

What is claimed is:

1. An information processing device adapted to provide a computer program to a user terminal having a processor for accessing a website having a plurality of articles, the computer program being adapted cause the processor of the user terminal to function as:

a display module that causes a first article of the plurality of articles of the website selected by a user to be displayed and causes a search window to be displayed; and a search module that searches for a second article related to a character string entered in the search window via an Ajax communication with a search server by using an XMLHttpRequest object, wherein the display module causes information related to the second article, that is identified by a search using the search module, and that is related to the character string entered in the search window, to be displayed near the search window, and the display module causes information related to the second article to be displayed dynamically during the search for the second article by the search module, wherein the computer program causes the processor of the user terminal to further function as an acquisition module that, in coordination with an external device that acquires, from a plurality of user terminals, information on a position in the first article where users stop viewing, performs a statistical process based on the information acquired from the plurality of user terminals, and generates statistical information related to the position in the first article where the users stop viewing, acquires information on a position where the search window should be displayed based on the statistical information, and the display module causes the search window to be displayed in the middle of the first article in accordance with the information on the position acquired by the acquisition module.

2. The information processing device according to claim 1, wherein the display module causes a web page including the first article to be displayed, the web page includes an article area where an article displayed is switched according to the user's operation for selection and a header area where a common content is displayed regardless of the article displayed in the article area, the display module causes a first search window to be displayed in the header area of the web page and causes a second search window different from the first search window to be displayed in the middle of the first article, thereby the first search window and the second search window are provided in the web page simultaneously, and the search module includes a first search module that searches for a second article of the plurality of articles of the website related to a character string entered in the first search window based on a first search logic and a second search module that searches for a second article of the plurality of articles of the website related to a character entered in the second search window based on a second search logic different from the first search logic.

3. The information processing device according to claim 2, wherein the first search logic extracts, as the second article, an article that includes the character string entered in the first search window in a title or a body text, and the second search logic extracts, as the second article, an article linked to a tag that matches the character string entered in the second search window.

4. An information terminal comprising a processor that executes a computer program for accessing a website having a plurality of articles, the computer program being adapted to cause the processor of the information terminal to function as:

a display module that causes a first article of the plurality of articles of the website selected by a user to be displayed and causes a search window to be displayed; and a search module that searches for a second article related to a character string entered in the search window via an Ajax communication with a search server by using an XMLHttpRequest object, wherein the display module causes information related to the second article, that is identified by a search using the search module, and that is related to the character string entered in the search window, to be displayed near the search window, the display module causes information related to the second article to be displayed dynamically during the search for the second article by the search module, the computer program causes the processor of the user terminal to further function as an acquisition module that, in coordination with an external device that acquires, from a plurality of user terminals, information on a position in the first article where users stop viewing, performs a statistical process based on the information acquired from the plurality of user terminals, and generates statistical information related to the position in the first article where the users stop viewing, acquires information on a position where the search window should be displayed based on the statistical information, and the display module causes the search window to be displayed in the middle of the first article in accordance with the information on the position acquired by the acquisition module.

5. The information terminal according to claim 4, wherein the display module causes a web page including the first article to be displayed, the web page includes an article area where an article displayed is switched according to the user's operation for selection and a header area where a common content is displayed regardless of the article displayed in the article area, the display module causes a first search window to be displayed in the header area of the web page and causes a second search window different from the first search window to be displayed in the middle of the first article, thereby the first search window and the second search window are provided in the web page simultaneously, and the search module includes a first search module that searches for a second article of the plurality of articles of the website related to a character string entered in the first search window based on a first search logic and a second search module that searches for a second article of the plurality of articles of the website related to a character entered in the second search window based on a second search logic different from the first search logic.

6. The information terminal according to claim 5, wherein the first search logic extracts, as the second article, an article that includes the character string entered in the first search window in a title or a body text, and the second search logic extracts, as the second article, an article linked to a tag that matches the character string entered in the second search window.

* * * * *